Nov. 20, 1962     J. H. BLACK ETAL     3,064,464

PRESSURE CONTROL SYSTEM FOR SHOCK TESTING MACHINE

Filed Sept. 30, 1959

INVENTORS
JUDD H. BLACK
BY HAROLD LYON

Bernard A. Chiama
ATTORNEY

United States Patent Office 3,064,464
Patented Nov. 20, 1962

3,064,464
PRESSURE CONTROL SYSTEM FOR SHOCK TESTING MACHINE
Judd H. Black and Harold Lyon, Rochester, N.Y., assignors, by mesne assignments, to Consolidated Vacuum Corporation, Rochester, N.Y., a corporation of New York
Filed Sept. 30, 1959, Ser. No. 843,552
4 Claims. (Cl. 73—12)

This invention relates to valves and in more particular to interlock valves for controlling pressure to a hydraulic or pneumatic shock testing system in accordance with safety features incorporated in the system.

The present invention is adapted for hydraulic or pneumatic shock testing systems employing a braking device associated with a thrust producing piston-cylinder actuator wherein initial movement of the actuator thrust piston is prevented until the actuating pressure within the actuator cylinder is at a predetermined value. In the present shock testing system, the braking device is normally effective while the actuating pressure in the actuator has initiated the sudden thrust exerted upon the thrust piston. The braking effect functions as a decelerating force and is such that the movement of the workpiece and its support is decelerated and stopped before the same reaches the terminus of any restraining device such as guide rails so that the workpiece and its support is not driven beyond the limits of the apparatus with the consequent damage to the apparatus and the building in which it is housed.

In application, an interlock valve is interposed between a source of fluid pressure and the actuator and is utilized to control the pressure to the actuator. A fluid pressure brake is associated with a worktable for the workpiece which may be in the form of a carriage or sled having a jig or other structure for supporting the workpiece. After firing of the actuator when the workpiece no longer experiences the effect of the thrust, the braking device serves to decelerate the moving workpiece which acquired certain momentum as a result of the thrust acting for a controlled time period and also to maintain the extended position of the workpiece. The interlock valve is normally closed to prevent the introduction of pressure to the actuator and is also connected with the brake device so that operation of the brake device to its braking condition will permit the interlock valve to assume its open position. The various structural elements, inlet and outlet ports of the interlock valve are cooperatively related such that fluid flow to the actuator cylinder is prevented until the braking device is in full braking condition with respect to the workpiece.

The principal object of the present invention is to incorporate into a pneumatic or hydraulic system a pressure control apparatus for a brake device which will insure braking condition thereof until the system is conditioned for operation and which will produce a decelerating force upon a moving testpiece for slowing down and eventually stopping movement thereof.

Another object of the invention is to arrange a pressure control apparatus in cooperation with a force producing system for rendering the latter fail-safe during the build-up of pressure in the system.

Other objects and advantages will become apparent from the following description taken in conjunction with the accompanying drawing wherein.

Figure 1:
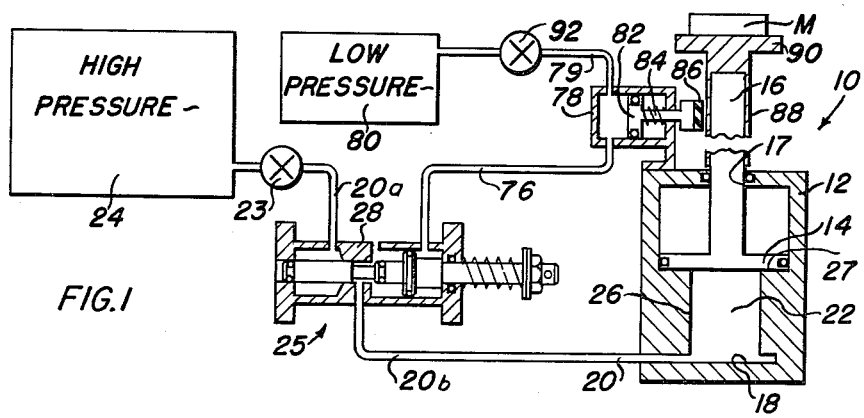
FIGURE 1 is a schematic illustration of the present invention as adapted to a pneumatically powered force producing system.

Referring now to FIGURE 1, there is shown a pneumatic thrust producing system including a pneumatic actuator 10 having a cylinder 12, a thrust piston 14 vertically movable therein and a thrust piston rod 16, connected to the piston and extending through an opening 17 in the top wall of cylinder 12. While shown in a reduced size, the cylinder 12 and thrust rod 16 are relatively long in order to attain a long working stroke for the rod and a workpiece which may be applied to the extreme outer end of the rod.

Vertical movement of the piston 14 is attained by the introduction of pneumatic pressure between the under side of the piston and the bottom wall 18 of the cylinder 12. To this end, there is provided a conduit 20 which is connected for communication with a pressure chamber 22 beneath the piston 14 and a source 24 of pneumatic pressure. A suitable valve 23 in the conduit 20a serves to control the fluid pressure there through. Interposed between the chamber 22 and the source 24 and connected to the conduit 20 is an interlock valve, generally indicated by the reference numeral 25. The details and operation of the valve 25 will be described more fully hereinafter.

The lower section of the cylinder 12 is provided with an integral cylindrical portion 26 which extends radially inwardly of the cylinder wall and terminates in an annular shoulder 27. The cross-sectional area of the chamber 22 as defined by the portion 26 is less than that of the cylinder 12 above the piston and when the piston 14 is resting on the shoulder 27, as shown in FIGURE 1, the build-up of pressure in the chamber 22 must be relatively large in order to move the piston 14 because of the smaller effective area thereof exposed to pressure. When the pressure is sufficient to lift the piston off the shoulder 27, the area of the piston initially unexposed will be added to the effective area of the piston resulting in a sudden and short thrust of the piston 14 and rod 16.

Figure 2:
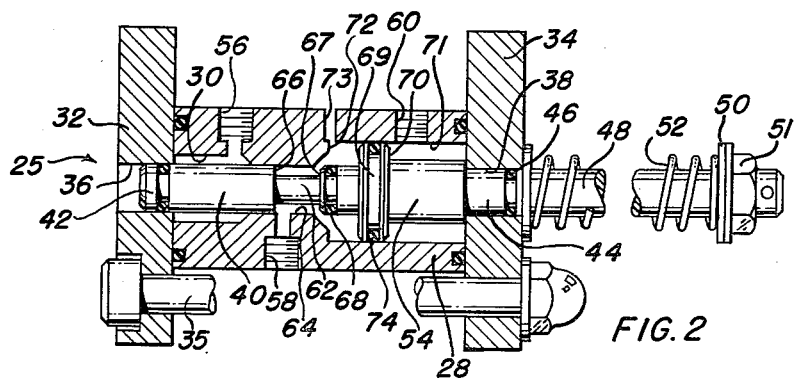
FIGURE 2 is a cross-sectional view of a control valve showing one position of operation.

As shown in FIGURE 2, the valve 25 comprises a cylindrical valve body 28 formed with a cylindrical valve chamber 30. The valve body is closed at both ends of plates 32 and 34 which are fastened in sealing relationship with the valve body by suitable bolts 35. The plates 32, 34 are formed with circular apertures 36, 38, respectively, which are arranged in axial alignment with each other and the axis of the valve chamber 30. Slidable within the valve chamber 30 is a spool type valve element 40 which has one end 42 slidably mounted in the aperture 36 and another end 44 slidably mounted in the aperture 38. Suitable O-rings 46 are mounted at these ends of the element 40 for slidable cooperation with the walls of the respective aperture, when the spool element 40 is moved axially in either direction, for continually sealing the chamber 30 from atmospheric effects.

The valve element 40 is also formed with a rod like extension 48 which is a continuation of the end 44 extending beyond the plate 34. The extreme end of the extension 48 has a washer 50 mounted thereon and a nut 51 adjustable therewith for varying the axial position of the washer. A coil spring 52 encircles the extension 48 and is held in compression between the washer 50 and the adjacent surface of the plate 34 thereby forcing the valve element 40 axially to the right, as viewed in FIGURE 2. Further movement of the valve element to the right from this position is prevented by a cylindrical land 54 formed on the valve element and engageable with the interior surface of the plate 34 adjacent the aperture 38.

The valve body 28 is formed with an inlet port 56 which permits the introduction of air pressure into the valve chamber from the source 24 by means of a portion 20a of the conduit 20. Another port 58 formed in the valve body 28 and being separated axially from the port 56 is connected for communication to the chamber 22 of the cylinder 12 by a second portion 20b of the conduit 20. A third port 60 formed in the body 28 and communicating with the interior thereof serves to introduce air pressure into the body 28 from a braking system to be described more fully hereinafter.

The spool valve element 40 is formed with a short portion 62 of slightly reduced diameter and generally located intermediate the ends 42, 44 of the valve element. An annular chamber 64 is defined by the surface of the portion 62 and the opposing surface of the body chamber 30 and between radially disposed pressure surfaces 66, 67 formed on the spool element 40. An O-ring 68 associated with the valve element 40, is positioned adjacent to the surface 67 of the portion 62 closest to the land 54.

Intermediate the surface 67 and the land 54 of the valve element 40 and secured thereto is a piston 69 having a diameter larger than the diameter of the valve element 40 and is coaxial therewith. The piston 69 separates the land 54, from the remaining portions of the spool element 40 and is provided with a pressure area surface 70 adjacent to the land 54. The piston 69 is adapted for sliding movement within a cylindrical chamber 71 formed in the valve body 28 as an enlarged extension of the body chamber 30. As shown in FIGURE 2, the piston 69 is normally positioned between the port 60 and an annular shoulder 72 which separates the larger chamber 71 from valve chamber 30. The portion of the chamber 71 which is in the side of the piston 69 opposite to that of surface 70 for all positions of the piston is vented to atmosphere by means of a vent 73 formed in the valve body 28. A suitable O-ring 74 positioned on the periphery of the piston 69 serves to maintain a seal between the periphery of the piston 69 and the cooperating surface of the chamber 71 during movement of the spool element 40.

With the valve element 40 in the position shown in FIGURE 2, fluid under pressure entering the chamber 30 from the source 24 by way of the port 56 is prevented from flowing into the outlet port 58 because of the engagement of the spool element 40 with the adjacent surface of the valve chamber 30. In this position of the spool element 40 the chamber 64 is in communication with vented portion of the chamber 71. Any leakage of fluid pressure from the source 24 will then be vented through the vent 73.

Figure 3:
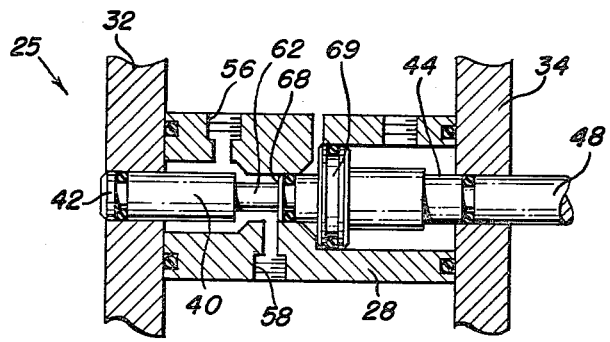
FIGURE 3 is a fragmentary view in cross-section of the valve illustrated in FIGURE 2 and indicating another position of operation.

When the valve element 40 is moved to its open position, as indicated in FIGURE 3, the chamber 64 is placed into communication with chamber 30 to permit the flow of air under pressure to the outlet 58. Movement of the valve element 40 to the left from the position shown in FIGURE 2, to the position shown in FIGURE 3, against the bias of the spring 52, is effected by the introduction of air pressure through the port 60 as will be presently described.

The introduction of air pressure into the chamber 71 is conducted through a conduit 76 from a pneumatic brake cylinder 78. The cylinder 78, in turn, is supplied with air pressure by way of conduit 79 from a suitable source 80 which may be in the form of a pressurized air tank. In actual practice, the sources 24 and 80 may be combined or have a common ultimate source, however, suitable pressure regulators will be needed to maintain respective pressures through the conduits 20a and 79. Slidably received within the cylinder 78 is a piston 82 and a piston rod 84 connected thereto. A brake pad 86 is arranged on the outer end of the rod 84 which projects through a suitable opening in the cylinder 78 to permit external use of the brake 86. The brake cylinder 78 is arranged so that the introduction of air pressure therein will cause outward movement of the piston 82 to force brake pad 86 against an elongated sleeve 88 which is slidably received on the upper end of the thrust rod 16 of the actuator 10.

Assuming that the actuator 10 is to be utilized as a means for the sudden application of a force upon a material or testpiece for determining the shock response thereof, a sample of the material M may be applied to a worktable 90 mounted at the upper end of the sleeve 88. In utilizing the apparatus for this purpose, it would be desirable to impart a tremendous initial upward thrust to the worktable 90 and material M, which is made available by means of the actuator 10. This thrust is applied when the worktable 90 is in its lowermost position and occurs for only a fraction of a second. This force or thrust is applicable for only a short distance of the total length of the stroke of movement for the worktable 90. After the force is spent, the sleeve 88 and worktable will continue to be moved by enertia while the movement of the thrust rod 16 will terminate when the thrust is no longer available. The remaining distance of the stroke is utilized to decelerate movement of the worktable to a stop position somewhere near the end of its travel as defined by suitable guide rods (not shown) for guiding the movement of the worktable. During movement of the worktable for its entire distance of travel, the brake pad 86 is always maintained in braking condition against the sleeve 88. In the short initial distance of travel, when thrust is applied, the brake has little or no effect in retarding movement of the worktable, however, in the remaining distance, the brake serves as a decelerating force to decelerate and stop this movement.

In order to render the actuator safe for complete operation during the application of pressure to the applicator 10 and the deceleration of the worktable, it is important that the brake device 78-86 be in operative condition with respect to the sleeve 88. To insure this condition, the interlock valve 25 is utilized between the source of pressure and the actuator cylinder chamber 22 for preventing the introduction of pneumatic pressure into the latter until the brake device is in full braking condition.

In operation, with the spool valve element 40 in the position shown in FIGURE 2, fluid under pressure from the source 24 is prevented from entering the actautor pressure chamber 22. Fluid pressure from the source 80, however, is permitted to enter the brake cylinder 78 for moving the brake pad 86 into engagement with the sleeve 88. A suitable control valve 92 in the conduit 79 serves to control the introduction of fluid pressure to the brake cylinder 78 and the predetermined value of pressure required to operate the brake to a braking condition.

Simultaneous with this operation, air under pressure from the source 80 enters the chamber 71 of the interlock valve 25 and when the pressure developed in chamber 71 reaches the pressure within the brake cylinder 78, the piston 69 and consequently the spool element commences to move to the left against the bias of the spring 52. The pressure of the source 80 and the pressure area 70 of the piston 69 is such that the force developed thereon by air pressure is sufficient to overcome the force imposed upon the piston by the spring 52. When the spool element 40 reaches the position shown in FIGURE 3, the chamber 64 will be positioned for communication with the valve chamber 30, thus permitting flow of air under pressure from the source 24 to the actuator pressure chamber 22. At the same time, the O-ring 68 will be moved into contact with the surface of valve chamber 30 to seal the chamber 64 from the chamber 71. In a typical installation, a pressure for the source 80 as small as 15-20 p.s.i. has been utilized to control a pressure of 2000 p.s.i. from the source 24. Regulation of the tension of the spring 52 by the nut 51 to a higher strength or interchanging springs having greater strengths will allow operation of the spool valve with brake pressures of a higher pressure range. Conversely, utilization of lighter springs will permit the control of pressures from brake pressures of a lower range.

When the air pressure within the chamber 22 is at a predetermined value, which may be simply computed by considering the area of the exposed portion of the piston 14, the weight of the material M, the thrust piston and rod and the effect of the brake, the piston will move from its position of rest on the cylinder 26. Upon this occurrence, the full area of this piston will suddenly be exposed to the pressure therebelow resulting in a sudden, almost explosive expansion in the chamber 22 and the simultaneous upward movement of the piston 14, and rod 16 and the material M. This movement of these parts developed directly by the sudden expansion is for short duration and involves a very small distance of travel of the thrust rod 16. The movement for the worktable 90 throughout the remaining distance results solely from the momentum of inertia exhibited by the parts by the initial thrust exerted thereon, and it is during this phase of operation that the brake 78–86 serves to decelerate this movement and to bring it to a stop when any desired distance has been attained.

By varying the braking effect, the distance of movement of the material during the inertial stage of operation may be controlled, that is, the distance may be varied before complete stoppage of movement. The effect of this control also involves the control of the deceleration of movement upon the material M, which may be a desirable property to-be-measured.

The force produced, as aforesaid, upon the moving parts is such that adequate measures must be taken to limit the extent to which worktable 90 is moved. The use of stops located in the path of movement of the worktable would be of little service since the wear and tear on all parts of the apparatus during a cycle of operation would be extreme. The braking device serves the purpose perfectly, however, careless handling of the various components of the apparatus may result in failing to actuate the brake entirely or serious leaks may develop in the brake system to render the same inoperative at about the time that the predetermined firing pressure within the chamber 22 has been reached.

The present invention avoids these difficulties by requiring a mandatory sequence of operation before firing. In this sequence, the brake must be in operation before pressure is applied to the actuator. In the event there is leakage in the conduits 76, 79, the brake cylinder 78 or any part of the interlock valve 25, the conduit 20 will thus become closed to the actuator. If during a build-up of pressure in the chamber 22, there is a leak in the brake system, the pressure supply to the actuator will be broken and vented to atmosphere via port 73. It will be appreciated then, that the present invention as applied to a shock testing apparatus is fail-safe.

From the foregoing, it will be apparent that the principal object of the invention, that of insuring the braking condition of a shock testing apparatus before the introduction of pressure to the thrust actuator of the apparatus, is achieved. Other advantages are also readily apparent, such as, fail-safe protection and minimum of parts which are simple and inexpensive. While there is in this application specifically described a preferred embodiment which the invention may assume in practice, it will be understood that the same is shown for purposes of illustration only, and that the same may be modified and embodied in various other forms or employed in other uses without departing from the spirit or the scope of the appended claims.

What we claim is:

1. In a fluid actuated force producing apparatus including a fluid operable actuator having a cylinder and a piston supported for sliding movement therein and a source of fluid pressure for imparting a sudden thrust to worktable coupled to the piston, the combination of an interlock valve means disposed between the source and the cylinder for controlling fluid pressure thereto, means for normally maintaining said valve means in a closed condition to prevent the introduction of said fluid pressure into the cylinder from said source, a braking device adapted for braking action upon the worktable, said braking device including a fluid operable member which when exposed to fluid pressure motivates said braking device to a braking condition, and means coupled between said braking device and said valve means for operating the latter to its open position when said fluid operable member is exposed to fluid pressure.

2. In a fluid actuated force producing apparatus including a fluid operable actuator having a cylinder and a piston supported for sliding movement therein, and a source of fluid pressure for imparting a sudden thrust to a worktable coupled to the piston, the combination of an interlock valve means disposed between the source and the cylinder for controlling fluid pressure thereto, means for normally maintaining said valve means in a closed condition to prevent the introduction of said fluid pressure into the cylinder from said source, a braking device adapted for braking action upon the worktable, said braking device including a fluid operable member which when exposed to fluid pressure motivates said braking device to a braking condition, and fluid pressure means coupled to said valve means and responsive to the fluid pressure within said fluid operable member of said braking device for operating said valve means to its open position and thereby permit the introduction of fluid pressure into the actuator.

3. In a fluid actuated force producing apparatus including a fluid operable actuator having a cylinder and a piston supported for sliding movement therein, and a source of fluid pressure for imparting a sudden thrust to a worktable coupled to the piston, the combination of an interlock valve means disposed between the source and the cylinder for controlling fluid pressure thereto, means for normally maintaining said valve means in a closed condition to prevent the introduction of said fluid pressure into the cylinder from said source, said valve means including a pressure responsive element movable to open said valve means when exposed to a predetermined fluid pressure, a braking device adapted for braking action upon the worktable, said braking device including a fluid operable member which when exposed to said predetermined fluid pressure operates said braking device to a braking condition.

4. A shock testing apparatus for exerting a short, sudden acceleration force upon a testpiece and then a decelerating force thereon, said apparatus comprising a testpiece supporting worktable, a fluid pressure actuator having a thrust rod arranged to impart the accelerating force to said worktable and also having a pressure chamber and a piston movable therein, said piston being connected to said thrust rod for movement therewith, fluid control means coupled between said piston and said pressure chamber for exerting a short, sudden force upon said piston when the fluid pressure within said chamber attains a predetermined value for imparting said accelerating force upon the testpiece, valve means interposed between said chamber and a source of fluid pressure for controlling the introduction of fluid pressure to said chamber from said source, means for producing a force upon the movement of said worktable in opposition to said accelerating force for exerting a decelerating force upon the testpiece, said last named means including a fluid operable device interconnected between said valve means and said fluid operable device for opening said valve means to permit the introduction of fluid pressure into said chamber when said fluid operable device is exposed to fluid pressure.

References Cited in the file of this patent

UNITED STATES PATENTS

| | | |
|---|---|---|
| 1,131,969 | Turner | Mar. 16, 1915 |
| 1,917,316 | Naab | July 11, 1933 |
| 2,810,288 | Herron et al. | Oct. 22, 1957 |
| 2,914,087 | Malek | Nov. 24, 1959 |
| 2,931,218 | Ottestad | Apr. 5, 1960 |
| 2,967,590 | Ottestad | Jan. 10, 1961 |